United States Patent [19]

Hassett et al.

[11] Patent Number: 5,289,183
[45] Date of Patent: Feb. 22, 1994

[54] TRAFFIC MONITORING AND MANAGEMENT METHOD AND APPARATUS

[75] Inventors: John J. Hassett, Marblehead; Keith E. Kowal, Swampscott; John A. Rourke, Marblehead, all of Mass.

[73] Assignee: AT/COMM Incorporated, Marblehead, Mass.

[21] Appl. No.: 901,278

[22] Filed: Jun. 19, 1992

[51] Int. Cl.$^5$ ............................................. G08G 1/09
[52] U.S. Cl. ..................................... 340/905; 340/928; 340/991; 364/436; 455/54.1
[58] Field of Search ............... 340/928, 905, 934, 936, 340/988, 991; 235/384; 455/54.1, 49.1, 89; 364/436, 437, 438, 424.01

[56] References Cited

U.S. PATENT DOCUMENTS

| | | |
|---|---|---|
| 3,602,881 | 8/1971 | Bayne et al. ........................ 340/928 |
| 4,031,513 | 6/1977 | Simciak ......................... 340/870.18 |
| 4,104,630 | 8/1978 | Chasek . |
| 4,303,904 | 12/1981 | Chasek ............................. 335/384 |
| 4,338,587 | 7/1982 | Chiappetti ......................... 340/928 |
| 4,350,970 | 9/1982 | von Tomkewitsch .............. 340/905 |
| 4,481,428 | 11/1984 | Charlot, Jr. ..................... 340/870.26 |
| 4,501,958 | 2/1985 | Glize et al. ......................... 235/382 |
| 4,591,823 | 5/1986 | Horvat ................................ 340/905 |
| 4,786,903 | 11/1988 | Grindahl et al. .............. 340/825.540 |
| 4,937,581 | 6/1990 | Baldwin et al. ...................... 342/44 |
| 4,962,457 | 10/1990 | Chen et al. .......................... 340/905 |
| 5,086,389 | 2/1992 | Hassett et al. ...................... 340/928 |
| 5,089,815 | 2/1992 | Potter et al. ........................ 340/905 |
| 5,144,553 | 9/1992 | Hassett et al. ...................... 340/928 |
| 5,182,555 | 1/1993 | Sumner ............................... 340/905 |

FOREIGN PATENT DOCUMENTS 0345818 12/1989 European Pat. Off. ............ 340/905
0159526 7/1987 Japan .
0288399 11/1988 Japan .

OTHER PUBLICATIONS

Desmond, "Toll Booth Net Automates Fare Collection Saves Cash", Network World, vol. 46, Issue N23, Jun. 12, 1989.
"Road Traffic Control", Apr. 15-18, 1986, von Tomkewitsch, 2nd International Conference.
Encyclopedia of Computer Science and Engineering, Van Nostrand Reinhold Company, inc., 1983, pp. 563-565.

Primary Examiner—Brent Swarthout
Attorney, Agent, or Firm—Lahive & Cockfield

[57] ABSTRACT

Methods and apparatus for the automatic and management of traffic, utilizing a microprocessor-based, read-write vehicle borne transponder device. The system includes plurality of transceivers spaced along and positioned adjacent to a roadway, a plurality of vehicle borne transponders, and an independent network management computer. As vehicles traverse the roadway the transponders communicate with the transceivers and one or both of those units collect information such as, vehicle entrance point, vehicle exit point, vehicle speed, number of passengers in each vehicle, and vehicle class. Some of the collected information is processed by the transceivers and transponders, while other information is transmitted to the network management computer for processing.

12 Claims, 3 Drawing Sheets

TRAFFIC MONITORING AND MANAGEMENT METHOD AND APPARATUS

REFERENCE TO RELATED PATENTS

The subject matter of this application is related to that disclosed in U.S. Pat. No. 5,086,389 entitled Automatic Toll Processing Apparatus and is a continuation in part of copending U.S. patent application No. 525,103, (now U.S. Pat. No. 5,144,553) entitled Electronic Vehicle Toll Collection System and Method. The above cited patent and patent application are assigned to the assignee of the present application, and are incorporated herein by reference.

BACKGROUND OF THE INVENTION

The present invention relates generally to systems for traffic monitoring and management. More particularly, it relates to apparatus and method for utilizing a two-way radio transceiver to accurately and automatically collect traffic data from vehicles as they traverse a roadway, bridge, tunnel or other form of transport, such as a railway.

An increasing number of vehicles are traveling over progressively more congested transportation networks. Collecting accurate data with regard to the use of those networks would be a great aid in efficiently managing those networks. Analysis of data, such as vehicle origination and destination points, speed of vehicles traveling between fixed points, and types of vehicles utilizing a particular route, would provide network engineers and planners with significant information with which to control and manage the network. Such information would also aid the network management authorities in planning expansions, planning repairs, and setting toll rates. Through efficient management practices, made possible by the availability of accurate network use information, managing authorities could reduce congestion, cut costs, and limit air pollution associated with vehicle emissions.

A number of prior art systems exist that provide data regarding vehicular traffic. These systems typically utilize vehicle detector technology such as inductive loops cut into a roadway, infrared detectors, acoustic detectors, cameras and/or radar counters. Such systems identify the presence of vehicles and thereby provide data from which analysts can roughly establish traffic density and vehicle speeds. The prior art systems do not provide a mechanism for collecting individual vehicle origination, and destination data. Additionally, those systems do not provide any means for storing or processing data within individual vehicles for later retrieving. Moreover, the prior art systems do not provide any way for a network management authority to communicate useful information, such as the availability of an alternate route, to individual vehicle operators.

Some proposed systems provide a one-way backscatter radio reflection communication signal. Those systems achieve this by utilizing a reflective vehicle identification tag. Reflective tag based systems suffer from several drawbacks. Perhaps, the primary drawback is their inability to have information written into a vehicle memory, thereby providing historical data for the individual vehicle. Also, reflective tag based systems do not perform accurately enough to determine the particular lane in which a vehicle is operating. They also do not provide any vehicle data storage or manipulation capability. Consequently, any data collected must be stored and processed in a centralized network computer system. Moreover, the reflective tag based systems also do not provide a communication interface by which relevant traffic information can be relayed to a vehicle operator. Consequently, reflective tag based systems are inadequate for use by network management authorities to efficiently manage any particular transportation network.

Accordingly, an object of the present invention is to provide a system for gathering data transmitted from the vehicles, such as vehicle origination and destination points, vehicle speed, and the types of vehicles utilizing a particular traffic network.

Another object of the invention is to provide a mechanism for storing, within a vehicle, data collected with regards to that vehicle in such a way that the data might be accessed at a later time.

A further object of the invention is to provide in vehicle processing capability so that the computational load on a centralized computer can be reduced.

An additional object of the invention is to provide a system wherein a network management authority can communicate relevant traffic information to individual vehicle operators traveling over a particular transportation network.

Other general and specific objects of the invention will in part be obvious and will in part appear hereinafter.

SUMMARY OF THE INVENTION

Broadly speaking, the present invention includes an apparatus and method for the analysis and management of vehicle traffic wherein a plurality of transceivers are stationed adjacent to a roadway, each of the transceivers transmitting radio frequency signals including information as to the identity of each of the transceivers and, usually, the date and time of the transmission. Vehicles using the roadways are each equipped with their own transponder which includes a radio frequency receiver and transmitter, a memory and a data processor. Information received by the transponder, such as the identity of a signal received from a roadside transceiver, is entered into the transponder's memory and may be processed with respect to other information in that memory, such as previously received signals from other roadside transceivers, to measure such factors as road speed. Both processed and unprocessed information, together with an identifying signal for the transponder storing the information, can be transmitted back to an interrogating roadside transceiver. The roadside transceivers are most suitably coupled to a central data processor station. With this type of information the central data processor can determine factors such as density of traffic, speed of traffic, congestion, and to some degree predict congestion at a further point along the roadway. This information can be employed for analysis of roadway usage etc. or can be employed in the short term to actuate the roadside transceivers to instruct identified vehicles with information, such as alternate routes, thereby avoiding the congestion. In order to implement this two-way data transmission the vehicle borne transponders may include a user interface with a human interface having elements such as input keyboards and displays. One particular application of such a system is for a vehicle entering a roadway to receive a signal indicating its entry, from a transceiver at that entrance and, similarly, receive a signal when it exits the roadway indicating the location of the exit transceiver. Calculations can then be carried out as to the distance traveled for determination of tolls and the like.

The invention also contemplates a method of analysis of traffic along a roadway and for controlling traffic flow along a roadway incorporating devices to perform the above described functions.

BRIEF DESCRIPTION OF THE DRAWINGS

For a fuller understanding of the nature and objects of the invention, reference should be made to the following detailed description and the accompanying drawings in which.

DETAILED DESCRIPTION

Figure 1:
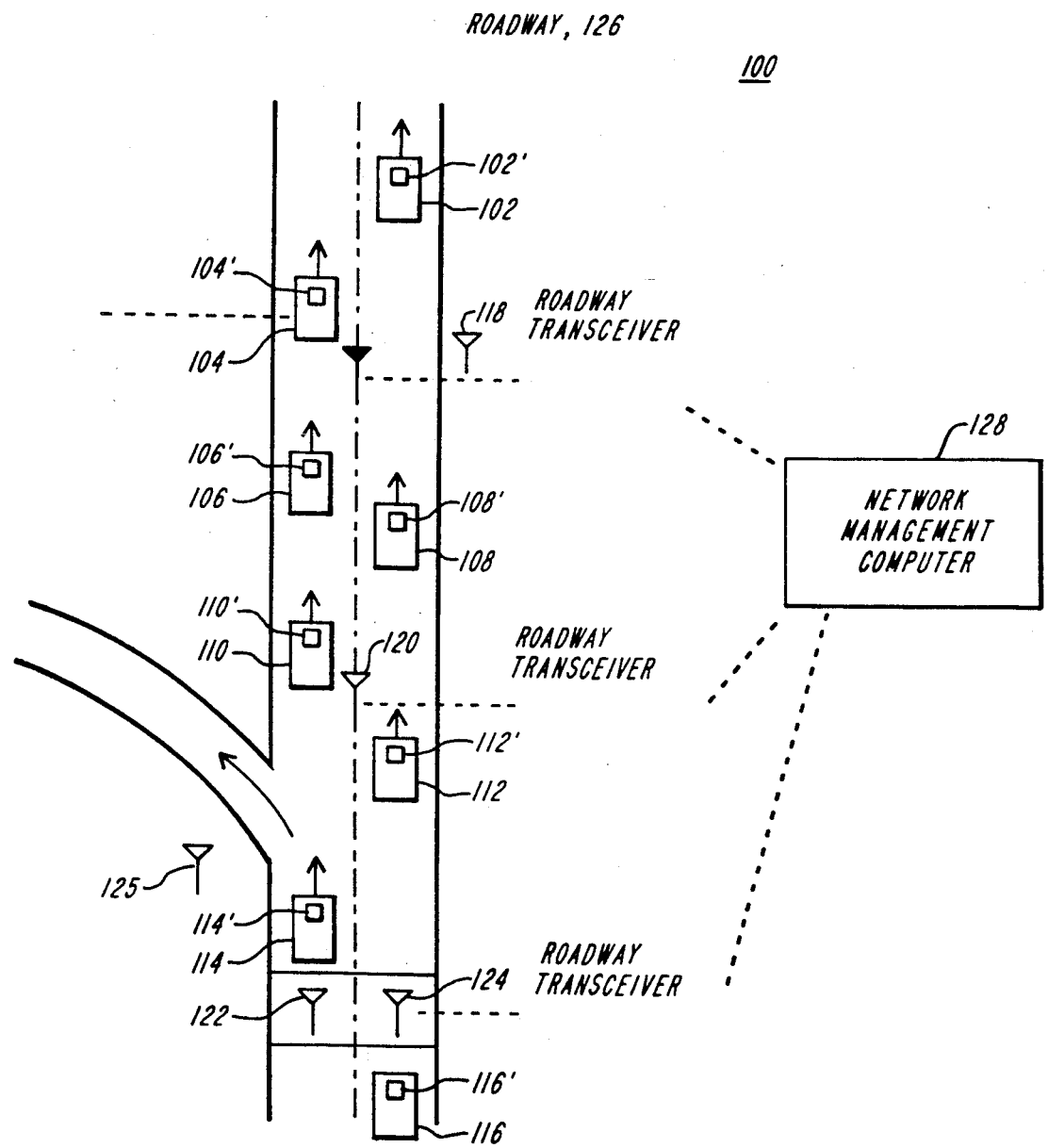
FIG. 1 shows a schematic block diagram of a roadway traffic monitoring and management system according to the invention.

FIG. 1 shows a block diagram of a roadway traffic monitoring and management system 100 according to the invention. The illustrated embodiment 100 enables information to be transferred between vehicle transponders 102'-116', located in host vehicles 102-116, and the roadway transceiver units 118-124, as the vehicles 102-116 travel along the roadway 126. The system 100 of FIG. 1 also provides a network management computer 128, in communication with the vehicle transponders 102'-116' by way of the roadside transceiver units 118-124.

For simplicity, FIG. 1 depicts a two-lane roadway 126, on which the direction of travel for a given host vehicle, referred to herein as the "downstream" direction, is indicated by arrows. Those skilled in the art will appreciate that the invention can be practiced in connection with roadways having additional lanes, including multi-lane, divided highways. As one skilled in the art will appreciate the invention can also be practiced in connection with numerous other transport systems, such as railways, and waterways.

The illustrated embodiment includes three primary components; the vehicle transponders 102'-116', the roadway transceivers 118-124, and the network management computer 128. As discussed in further detail below, a vehicle transponder, according to a preferred embodiment, is carried by a host vehicle and includes a radio frequency transmitter and receiver, a microprocessor, memory, an audio interface, and a visual display. The vehicle transponders receive, store, process and transmit various information pertaining to a host vehicle's use of the roadway 162, to the roadway transceivers 118-124. The vehicle transponders also receive relevant traffic information from the network management computer 128 via the roadway transceivers, and relay that information to the vehicle operators by way of each transponder's audio interface and visual display.

Each roadway radio frequency transceiver unit includes a radio frequency transmitter, a radio frequency receiver, a microprocessor, and a memory. The roadway transceivers 118-124 are situated adjacent to the roadway. According to one preferred embodiment, the roadway transceiver units are situated directly over a layer in a multiple lane roadway. This is illustrated, for example, by transceiver units 122 and 124. According to other embodiments, the transceiver units are located over the median divider or along side the roadway, illustrated at 120 and 118, respectively. The transceiver units 118-124 can also be located below ground.

The roadway transceiver units 118-124 signal the vehicle transponders to store, process, and transmit various information pertaining to the host vehicles use of the roadway 126. The transceiver units 118-124 also relay communications between the network management computer 128 and the vehicle transponders.

The network management computer 128 processes information received from the roadway transceiver units 118-124 and relays various relevant traffic information to the vehicle operators, by way of the roadway transceiver units 118-124 and the vehicle transponders 102'-116'.

Referring to FIG. 1, generally, vehicles 102-116, carrying vehicle transponders 102'-116' travel along the roadway 126. As each vehicle borne transponder 102'-116' enters the radio field radiated by the transmitter portion of a roadside transceiver, it decodes information packets transmitted to it by the roadside transceiver. The information packets can be of variable length. The information packets can include information to be rebroadcast, by the vehicle transponder, to a downstream roadside transceiver, such as identity and time/date of original point of entry. This information may also be used by the vehicle transponder to perform calculations to determine parameters, such as current vehicle speed, for broadcast back to that roadside transceiver or to a downstream transceiver, or for communication to the vehicle driver by way of the audio/visual interface included in the vehicle transponder. The information packets, can also contain information, being relayed to the driver by the network management computer 128, and pertaining to relevant traffic conditions.

As the vehicle continues traveling over the roadway, it encounters a plurality of periodically spaced roadway transceivers. Those transceivers also broadcast and receive information and can cause transactions of the type discussed above, to occur a subsequent time.

According to one preferred embodiment, the vehicle transponder includes a keypad that allows a vehicle operator to access information stored in the vehicle transponder memory. The keypad also allows a vehicle operator to enter information, such as vehicle class, into the vehicle transponder.

According to a first feature of the invention, as a vehicle 116, equipped with a vehicle transponder 116', enters a roadway 126, it passes a transceiver 124. That transceiver 124 broadcasts, to the vehicle transponder 116', a reference designation which denotes the point of entry onto the roadway 126. Upon exiting the roadway 126, a second transceiver, for example, 125 broadcasts an instruction to the vehicle transponder 116', to transmit back to the second transceiver 125, the stored information pertaining to the point of entry. The roadside transceiver 125 in turn transmits this information to the network management computer 128. This type of information provides traffic engineers and planners with a precise picture of traffic patterns, and helps them anticipate road repairs, road expansions, congestion problems, and other demographics pertaining to the traffic.

According to another feature of the invention, as vehicles 102-116 traverse the roadway 126 they pass roadway transponder 124 that communicates time and date information to the vehicle transponders 102'-116'. The vehicle transponders store this information in their internal memories. Downstream the vehicles 102-106 pass other roadway transceivers 118 and 120. According to one embodiment, the subsequent transceivers 118 and 120 also transmit time and date information. The vehicle transponders 102'-116' receive this subsequent time and date information and uses it to internally calculate individual vehicle speeds. The vehicle transponders then relay the speed information back to the network management computer 128 upon interrogation by one of the subsequent roadway transceivers 118 and 120. In an alternate embodiment, a subsequent transceiver 120 signals the vehicle transponders 102'-116' to transmit the original time and date information that they received from the upstream transceiver 124. The transceiver 120 then either relays the information to the network management computer 128 for analysis, or processes the data itself to determine vehicle speed and then relays the speed information to the network management computer 128. As can be seen, including microprocessors in both the vehicle transponders and the roadside transceivers provides substantial flexibility in allocating such data processing tasks. Traffic engineers can use speed and number of vehicles information to determine traffic density and congestion. Additionally, traffic density and congestion can be anticipated.

According to a further feature of the invention, the vehicle operators utilize the keypad interface to enter into their vehicle transponders various vehicle data, such as number of axles, number of passengers or vehicle class. As the vehicle traverses the roadway 128, the roadway transceivers interrogate the vehicle transponder to retrieve this information for traffic analysis. If the roadway is a toll road, the roadway transceivers can also communicate to the vehicle transponder which toll lane the vehicle operator should select for the fastest or most appropriate processing. The vehicle transponder in turn communicates this information to the operator by way of the audio/visual interface incorporated into the vehicle transponder.

An additional feature of the invention provides for an operator interface to the network management computer wherein the operator interface allows a traffic engineer to communicate with individual vehicle transponders. For example, if the network management computer projects impending congestion based on high density and low road speeds from information calculated from the vehicle transponders and the roadside transceivers, the traffic engineer can remotely program the appropriate roadside transceivers to signal a subset of the vehicle transponders to instruct those operators via the vehicle transponder audio/visual interface, to select an alternate route. The selected roadside transceivers accomplish this by constantly interrogating passing vehicles to establish communications with the vehicle transponders. Upon establishing communication with the transponder, the roadside transceiver can then communicate the alternate route information to selected vehicles. Video cameras can also be incorporated into the system at selected locations to provide the traffic engineer with additional feedback as to the effectiveness of the broadcast instructions.

Figure 2:
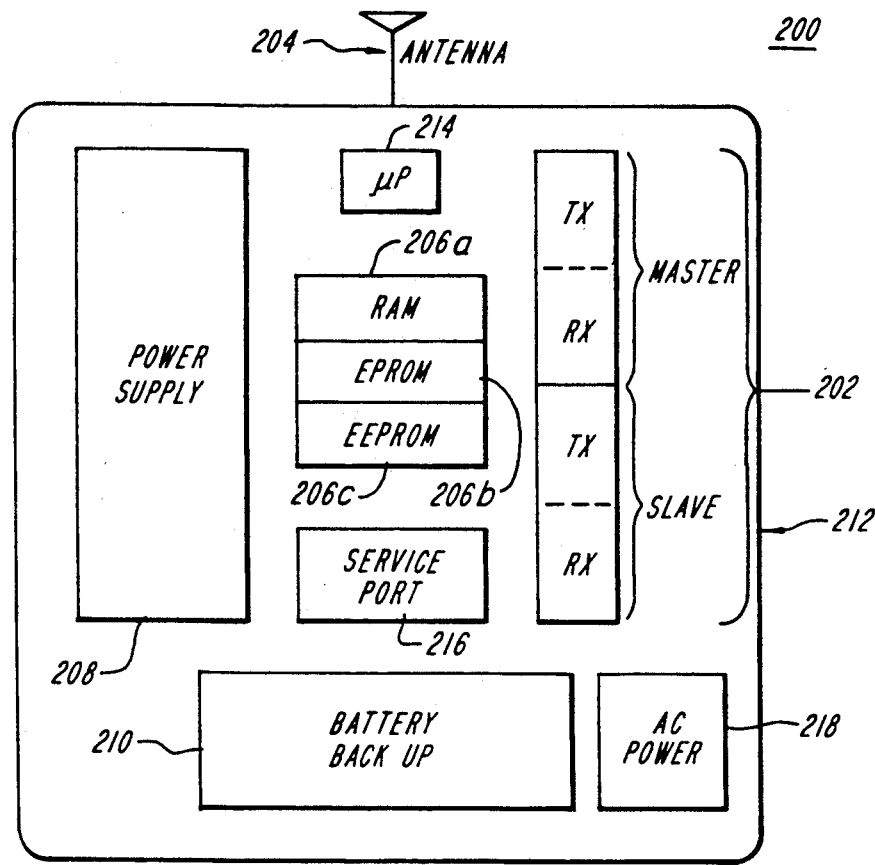
FIG. 2 is a simplified block diagram of a transceiver unit of the type depicted in FIG. 1 and constructed in accordance with the invention.

FIG. 2 shows a block diagram of a roadway transceiver unit 200 of the type depicted in FIG. 1, and constructed in accordance with the invention. Those skilled in the art will appreciate that while the illustrated transceiver utilizes radio frequency signal generating elements, the invention can also be practiced in connection with transceiver components utilizing infrared (IR) or other radiant electromagnetic energy wavelengths.

As discussed above, the roadside transceivers repeatedly emit an encoded signal that provides the vehicle transponders with instructions regarding the collection of data for analysis of roadway usage patterns The format of the particular communications is discussed below.

Each of the illustrated roadway transceivers units 200 include a conventional master/slave transmitter and receiver elements 202; an antenna element 204; a memory element 206, including a random access memory (RAM) 206a, an electrically programmable read only memory (EPROM) 206b, and an erasable electrically programmable read only memory (EEPROM) 206c; a power supply element 208; a back-up battery 210; a microprocessor element 214; a service port 216; and an AC power supply element 218. These components are conventional in design and materials, and the transmitter and receiver elements can be constructed in accordance with known engineering practices The complete transceiver assembly is preferably enclosed in a rugged weatherproof housing 212, to withstand the ranges of temperature, humidity, and ultraviolet radiation typical of the roadway environment. The transceiver 200 can be activated by an infrared or optical vehicle detector, so that the transceiver 202 emits signals only when a vehicle is in proximity to it.

Figure 3:
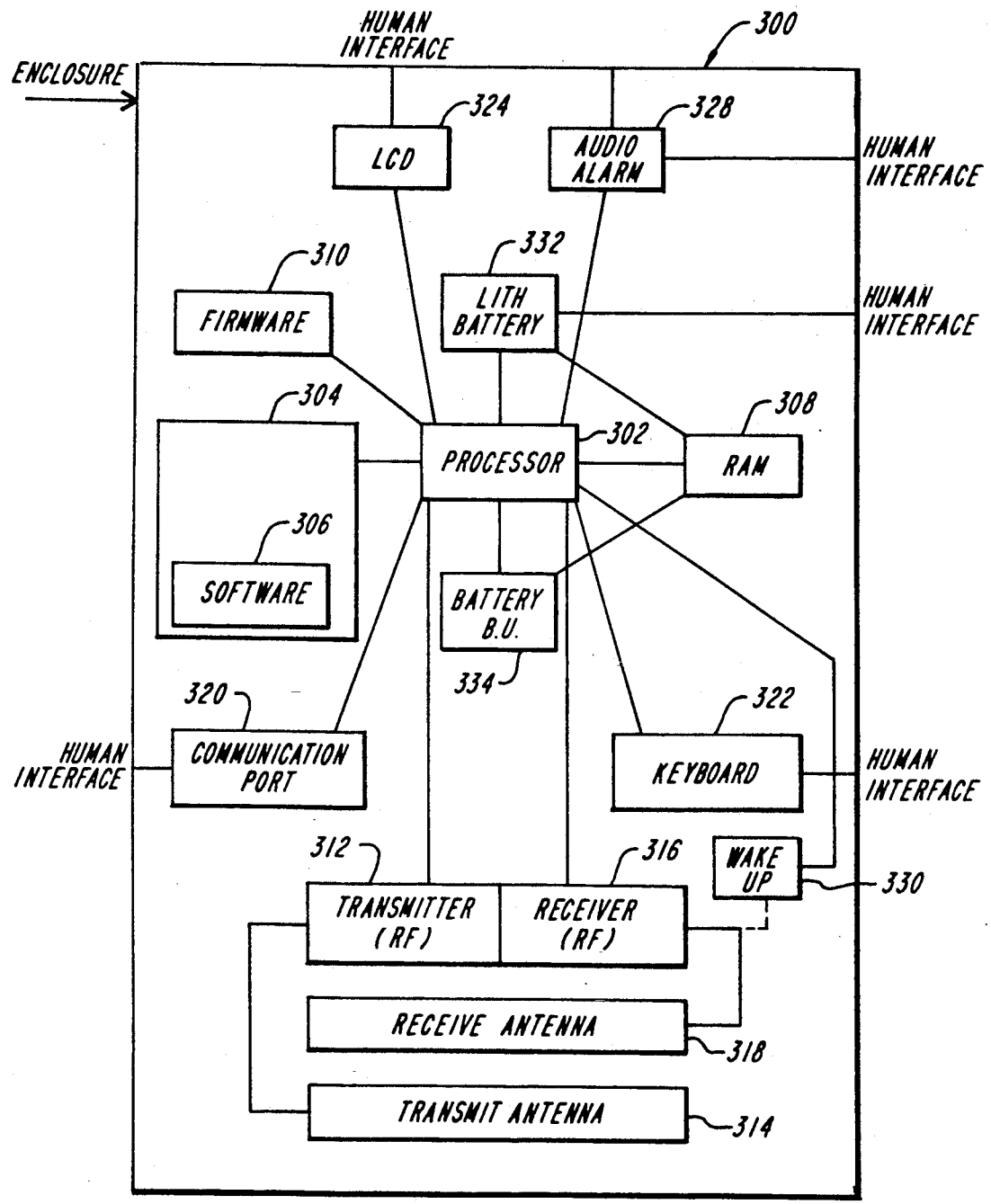
FIG. 3 is a schematic block diagram of a vehicle transponder, particularly adapted for operation in the system of FIG. 1.

FIG. 3 is a schematic block diagram of a vehicle transponder 300, particularly adapted for operation in the system 100 depicted in FIG. 1. The vehicle transponder 300 includes a processing element 302, an associated EPROM 304 for storing control software 306 a CMOS RAM element 308 for storing information collected from the roadway transceiver units, control firmware 310, an RF transmitter 312, and associated antenna module 314, an RF receiver 316 and an associated antenna 318, user interface elements 322, 324, and 328, a bi-directional communications port 320 and a vehicle transponder wake-up element 330 for signaling the vehicle transponder that an incoming transmission is beginning.

The processing element 302 can be an 8086 or other microprocessor capable of executing the calculations necessary to process the collected traffic information. The microprocessor also controls decoding an interpretation of encoded communication signals received from roadway transceivers. The RAM element 308 preferably provides sufficient storage to store the collected traffic information.

The vehicle transponder antennas 314 and 318 can be incorporated into the vehicle transponder, or a receptacle can be provided to attach a conventional window-mounted antenna, similar to those employed in connection with cellular telephones.

The user interface elements preferably include user operable keys 322, LCD or LED display units 324 and an audio speech synthesis module 328. The display and audio elements provide visual and audio information, such as instructions to proceed to an alternate route or to proceed to a particular toll collection lane. As previously discussed, such instructions usually originate at the network management computer and are relayed to the vehicle transponders by way of the roadway transceiver units. The display 324 and user interface keys 322 in combination with conventional EPROM-stored software routines 306 for controlling the microprocessor 302, enable the user to view information collected by the vehicle transponder and also to enter other information, such as vehicle class, number of axles, and number of passengers, as requested by roadway transceiver units. According to one embodiment, the user interface includes an alphanumeric display having two lines of ten characters each.

The bidirectional communication port 320 enables other microprocessors to write data into and read data out of the vehicle transponder RAM 308. These read/write functions provide the option for collecting data over a long period of time and then having the vehicle operator return the vehicle transponder back to the network management authority for complete analysis.

The power supply elements preferably include a compact, user-replaceable long-life battery 332, such as a lithium power cell. The power supply also includes a battery backup 334 so that the RAM 308 is not cleared during replacement of the lithium cell 332.

The vehicle transponder components, depicted in FIG. 3, are conventional in design and construction, and the vehicle transponder can be constructed in accordance with known transponder and microprocessor control principles. The illustrated vehicle transponder/processor 300 can be housed in a compact, portable enclosure adapted for removable attachment to a dashboard surface or other convenient location within the vehicle.

As previously mentioned, the vehicle transponder receiver 316 decodes, and stores signals transmitted at the roadway transceiver units. The vehicle transponder processor 300 also interprets the received signals and in response either collects data specified by the signals, transmits information back to the interrogating transceiver, or signals the vehicle operator, via the audio/visual interface, to take a specified action.

Information packets transmitted and received by the vehicle transponder processor 300 can be flexibly configured with or without a fixed length. Additionally, the packets can incorporate an encrypted synchronization portion, a transaction portion, and a check sum portion. According to the invention, the communication format can be modified to suit particular applications.

According to one preferred embodiment, information packets are transmitted in the form:

SYNC/TT/DATA/CK SUM

SYNC denotes an encrypted synchronization field to indicate that a message is about to begin and that message is from a device which is allowed access to the vehicle transponder. TT is a binary code identifying the type of data field included in the packet. DATA is a substantive portion of the information packet, requests for transmission, messages to be displayed to the vehicle operator, or requests to collect certain types of data. CK SUM represents error detection codes used to ensure transmission fidelity.

Examples of DATA filed include

DTS

LOCATION

MESSAGE

DISPLAY

DTS is a current date and time stamp. It can be included in either a transmission from a roadway transceiver to a vehicle transponder or from a vehicle transponder to a roadside transceiver. LOCATION is a code, transmitted from a roadside transceiver, and indicative of the location of the particular transceiver. MESSAGE is a data field, transmitted from a roadside transceiver, containing a message for the vehicle operator. The vehicle transponder alerts the operator as to the message by activating one or both of the audio and visual user interfaces.

It will thus be seen that the invention efficiently attains the objects set forth above, among those made apparent from the preceding discussion. In particular, the invention provides method and apparatus for providing an automated system for gathering data such as vehicle origination and destination points, vehicle speed, vehicle class, and the number of passengers a vehicle is carrying, in connection with a particular traffic network.

It will be understood that changes may be made in the above construction and in the foregoing sequences of operation without departing from the scope of the invention. The illustrated radio frequency transmitters, for example, may be replaced by infrared transmitters or emitters operating in other regions of the electromagnetic spectrum. Moreover, the invention can be practiced in connection with railway or waterway vehicles.

It is accordingly intended that all matter contained in the above description or shown in the accompanying drawings be interpreted as illustrative rather than in a limiting sense.

Having described the invention, what is claimed as new and secured by the Letters Patent is:

1. Apparatus for the analysis and management of vehicle traffic along a roadway comprising, a plurality of transceivers positioned adjacent to said roadway, each of said transceivers including means for transmitting radio frequency signals toward said roadway, said signals including information signals including a location of said transceiver, and a current date and time, a plurality of transponders, each of said transponders being located in separate ones of said vehicles passing along said roadway, each of said transponders including a data processor, a memory, and a receiver/transmitter, intercoupled such that said information signals transmitted from said transceiver can be received, and processed in said data processor and at least a subset of said information signals can be stored in said memory in at least one of, received and processed form, and independent data processor means coupled to said transceiver for two-way communication with said transceiver, and wherein said memory includes means for storing a first said current date and time received from a first one of said transceivers, and said apparatus includes a second one of said transceivers, positioned downstream from said first transceiver and including means for signaling said transponders to transmit said first current date and time to said second transceiver.

2. Apparatus in accordance with claim 1 wherein said second transceiver includes transceiver processor means for using said first current date and time to calculate an elapsed time between when a vehicle containing one of said transponders passes said first transceiver and when said vehicle passes said second transceiver.

3. Apparatus in accordance with claim 2 wherein said independent data processor includes means for interrogating said second transceiver to recover said elapsed time for at least selected ones of said vehicle transponders, and means for using elapsed time received in connection with a plurality of said vehicles to generate signals indicative of roadway vehicle congestion.

4. Apparatus for the analysis and management of vehicle traffic along a roadway comprising, a plurality of transceivers positioned adjacent said roadway, each of said transceivers including means for transmitting radio frequency signals toward said roadway, said signals including information signals including a location of said transceiver, and a current date and time, a plurality of transponders, each of said transponders being located in separate ones of said vehicles passing along said roadway, each of said transponders including a data processor, a memory, and a receiver/transmitter, intercoupled such that said information signals transmitted from said transceiver can be received, and processed in said data processor and at least a subset of said information signals can be stored in said memory in at least one of, received and processed form, and independent data processor means coupled to said transceiver for two-way communication with said transceiver, said roadway including a plurality of entrances and a plurality of exits, and said apparatus including an associated entrance transceiver located at each of said entrances and an associated exit transceiver located at each of said exits, each of said transponders including means for recognizing an information signal received from any of said entrance transceivers as each said vehicle carrying each said transponder travels past said entrance transceivers and for storing said information in its memory wherein said information signal is indicative of the location of the one of said roadway entrances at which each said vehicle entered said highway, said exit transceivers including means for signaling each of said transponders to transmit to said associated exit transceiver said information signal indicative of the one of said entrances at which its associated vehicle entered said roadway, and said independent data processor including means for signaling said transceivers associated with said roadway exits to transmit to said independent data processor said information signals relating to where said vehicles entered said roadway in relation to where said vehicles exited said roadway, and means for processing said information to determine traffic patters of vehicles entering and exiting said roadway.

5. Apparatus for the analysis and management of vehicle traffic along a roadway comprising, a plurality of transceivers positioned adjacent said roadway, each of said transceivers including means for transmitting radio frequency signals toward said roadway, said signals including information signals including a location of said transceiver, and a current date and time, a plurality of transponders, each of said transponders being located in separate ones of said vehicles passing along said roadway, each of said transponders including a data processor, a memory, and a receiver/transmitter, intercoupled such that said information signals transmitted from said transceiver can be received, and processed in said data processor and at least a subset of said information signals can be stored in said memory in at least one of, received and processed form, and independent data processor means coupled to said transceiver for two-way communication with said transceiver, wherein each of said transponders includes a user interface means for allowing a vehicle operator to enter information pertaining to said vehicle, including at least one of number of passengers, number of axles, vehicle weight, vehicle identification number, and vehicle class, into said memory included in said transponders, and wherein each of said transponders includes audio/visual interface means coupled to said data processor, to said memory and to said receiver/transmitter, for providing at least one of an audio and a visual signal to a vehicle operator wherein said signal is indicative of at least one of an instruction received from said transceiver to input by way of said user interface, at least one of the number of passengers, the number of axles, vehicle weight, vehicle identification number and vehicle class.

6. Apparatus in accordance with claim 5 wherein said independent data processor includes means for signaling vehicle operators by way of said transceivers and said transponders to input at least one of said number of passengers, number of axles, vehicle weight, vehicle identification number, and vehicle class.

7. Apparatus in accordance with claim 6 wherein said transceiver includes means for signaling said transponders to transmit an information signal indicative of at least one of said number of passengers, number of axles, vehicle weight, vehicle identification number and vehicle class.

8. Apparatus in accordance with claim 7 wherein said transceiver includes means responsive to said information signal transmitted from said transponder and for signaling said transponders to select at least one of a particular alternate route and a particular toll lane.

9. Apparatus in accordance with claim 6 wherein said independent data processor means includes means for signaling said transceiver to transmit, to said independent data processor means, said information signal indicative of at least said number of passengers, number of axles, vehicle weight, vehicle identification number, and vehicle class.

10. Apparatus in accordance with claim 9 wherein said independent data processor means includes means for processing said information signal indicative of at least said number of passengers, number of axles, vehicle weight, vehicle identification number, and vehicle class, to determine traffic patterns regarding vehicles using said roadway.

11. Apparatus in accordance with claim 10 wherein said independent data processor means includes means responsive to said information signal for communicating to said transceiver to transmit a command signal to said transponders wherein said command signal includes at least one of a toll lane suggestion and an alternate route suggestion.

12. Apparatus in accordance with claim 11 wherein said transceiver includes means responsive to a communication received from said independent processor means for transmitting, to said transponders, command signals including at least one of a toll lane suggestion and an alternate route suggestion.

* * * * *